(12) United States Patent
Lee et al.

(10) Patent No.: US 7,835,281 B2
(45) Date of Patent: Nov. 16, 2010

(54) METHOD AND SYSTEM FOR ALLOCATING RESOURCES IN A COMMUNICATION SYSTEM

(75) Inventors: Hee-Kwang Lee, Auyang-si (KR); Jung-Won Kim, Seoul (KR); Chang-Soo Park, Seongnam-si (KR); Yoo-Seung Song, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 639 days.

(21) Appl. No.: 11/801,362

(22) Filed: May 9, 2007

(65) Prior Publication Data

US 2008/0034107 A1 Feb. 7, 2008

(30) Foreign Application Priority Data

May 9, 2006 (KR) ........................ 10-2006-0041560

(51) Int. Cl.
*H04J 1/16* (2006.01)
(52) U.S. Cl. .................... 370/232; 370/322; 370/432
(58) Field of Classification Search ............. 370/229, 370/230, 232, 322, 344, 431, 432; 455/450, 455/451, 452.1, 452.2
See application file for complete search history.

(56) References Cited

U.S. PATENT DOCUMENTS

| | | | | |
|---|---|---|---|---|
| 5,729,292 A | * | 3/1998 | Acampora et al. ..... | 375/240.25 |
| 6,400,699 B1 | * | 6/2002 | Airy et al. .................... | 370/329 |
| 6,621,824 B1 | * | 9/2003 | Lauffenburger et al. ..... | 370/412 |
| 7,436,765 B2 | * | 10/2008 | Sisto et al. .................. | 370/230 |
| 2003/0048799 A1 | * | 3/2003 | Jang ........................... | 370/431 |
| 2004/0190640 A1 | * | 9/2004 | Dubuc et al. ................. | 375/260 |
| 2005/0232181 A1 | * | 10/2005 | Park et al. .................... | 370/319 |
| 2006/0007871 A1 | * | 1/2006 | Welin .......................... | 370/252 |
| 2007/0060145 A1 | | 3/2007 | Song et al. | |
| 2007/0274253 A1 | * | 11/2007 | Zhang et al. ................. | 370/328 |
| 2008/0240022 A1 | | 10/2008 | Yoon et al. | |

FOREIGN PATENT DOCUMENTS

| | | |
|---|---|---|
| KR | 1020050053312 | 6/2005 |
| KR | 1020060016279 | 2/2006 |
| KR | 1020070010597 | 1/2007 |
| KR | 1020070017272 | 2/2007 |

* cited by examiner

*Primary Examiner*—Jason E Mattis
*Assistant Examiner*—Dady Chery
(74) *Attorney, Agent, or Firm*—The Farrell Law Firm, LLP (57) ABSTRACT

Disclosed is a method and system for allocating resources in a communication system. The method includes calculating a size of a transmission area for transmitting the generated data when data to be transmitted to mobile stations is generated; and controlling data to be transmitted through the transmission area and then allocating the controlled data to the transmission area according to priorities of data bursts based on sizes of the data bursts.

28 Claims, 6 Drawing Sheets

METHOD AND SYSTEM FOR ALLOCATING RESOURCES IN A COMMUNICATION SYSTEM

PRIORITY

This application claims priority under 35 U.S.C. §119(a) to a Korean Patent Application filed in the Korean Industrial Property Office on May 9, 2006 and assigned Serial No. 2006-41560, the contents of which are hereby incorporated by reference.

BACKGROUND OF THE INVENTION

1. Field of the Invention

The present invention relates to a communication system, and more particularly to a method and a system for allocating downlink resources in a communication system.

2. Description of the Related Art

In the next generation communication systems, active research is in progress to provide users with high-speed services having various Qualities of Service (QoS). Especially in the current next generation communication systems, active research is in progress to guarantee mobility and QoS for Broadband Wireless Access (BWA) communication systems, such as a Wireless Local Area Network (WLAN) system and a Wireless Metropolitan Area Network (WMAN) system. Representatives of such communication systems include an Institute of Electrical and Electronics Engineers (IEEE) 802.16a/d communication system and an IEEE 802.16e communication system.

The IEEE 802.16a/d communication system and the IEEE 802.16e communication system, which are the BWA communication systems, employ an Orthogonal Frequency Division Multiplexing (OFDM)/Orthogonal Frequency Division Multiple Access (OFDMA) scheme in order to support a broadband transmission network for a physical channel of the WMAN system. The IEEE 802.16a/d communication system considers only a single cell structure with a state in which a current Subscriber Station (SS) is stationary, without considering mobility of the SS at all. However, the IEEE 802.16e communication system considers mobility of the SS in addition to the IEEE 802.16a communication system. As used herein, an SS having mobility is called a Mobile Station (MS).

The IEEE 802.16e communication system transmits a plurality of sub-carriers while maintaining the orthogonality between them, thereby achieving an optimum transmission efficiency for high-speed data transmission. Further, the IEEE 802.16e communication system has a good frequency use efficiency and is robust against multi-path fading, so that the communication system can achieve an optimum transmission efficiency for high-speed data transmission. Further, because the OFDM/OFDMA scheme uses overlapping frequency spectrums, the communication system effectively uses the frequency and is robust against the frequency selective fading and the multi-path fading. Moreover, the OFDM/OFDMA scheme can reduce the influence of an Inter-Symbol Interference (ISI) by using a guard interval, and can achieve simple design in a hardware structure of an equalizer.

Meanwhile, the OFDM/OFDMA scheme properly distributes resources in order to enhance the degree of use of channels between a Base Station (BS) and a plurality of MSs located within one cell. In a communication system employing the OFDM/OFDMA scheme, one of sharable resources is a sub-carrier, and an optimum degree of channel use is guaranteed according to how sub-carriers are allocated to MSs within a cell. Here, a set including at least one sub-carrier is a sub-channel.

Further, in the IEEE 802.16e communication system, data is transmitted frame by frame, and each frame is divided into an interval for transmitting downlink data and an interval for transmitting uplink data. An uplink data interval and a downlink data interval are divided according to a frequency axis and a time axis. Each element two-dimensionally arranged according to the frequency axis and the time axis is called a slot. Therefore, for allocation of downlink data bursts of an MS, the BS uses a normal MAP, new a normal MAP, or a Hybrid Automatic Repeat reQuest (H-ARQ) MAP. The data bursts occupy multiple time slots and are allocated to the downlink data interval.

However, there has been no specific scheme for allocating the data bursts to data burst areas of a frame in the IEEE 802.16e communication system. Therefore, the IEEE 802.16e communication system requires a scheme for allocation and operation of data burst regions in the frame. Further, in the IEEE 802.16e communication system, which is a BWA communication system, a BS efficiently allocates resources of each frame to MSs and transmits the resource allocation information to the MSs through a MAP message. Here, a MAP message transmitting downlink resource allocation information is a DownLink MAP (DL-MAP) message and a MAP message transmitting uplink resource allocation information is an UpLink MAP (UL-MAP) message.

When the BS has transmitted the downlink resource allocation information and the uplink resource allocation information through the DL-MAP message and the UL-MAP message, each of the MSs can detect locations of the resources allocated to the MS itself and control information of data to be received by the MS itself, by decoding the DL-MAP message and the UL-MAP message. By detecting the allocated resource locations and the control information, the MSs can receive or transmit data through the downlink and uplink.

Meanwhile, the MAP message includes different MAP Information Element (IE) formats according to the type of link (downlink or uplink) and according to the type of data bursts (according to whether the data bursts employ the HARQ scheme, do not employ the HARQ scheme, or include control information). Therefore, the MSs can decode each MAP IE only when they are aware of each MAP IE format in advance. Each MAP IE can be identified by using a Downlink Interval Usage Code (DIUC) in the case of the downlink, while it can be identified by using an Uplink Interval Usage Code (UIUC) in the case of the uplink.

In the IEEE 802.16e communication system, data is transmitted to a plurality of MSs located within one cell during one frame, and the resources allocated to each MS located within the cell for data transmission have changeable sizes. Therefore, when data is transmitted to a plurality of MSs located within one cell in the IEEE 802.16e communication system, a DL-MAP message indicating allocation information of resources allocated to each MS for data transmission is transmitted by the same frame as that of the data to be transmitted. Further, as the size of the DL-MAP message increases, the resources to be allocated for the data to be transmitted decreases. As a result, the resources to be allocated for data transmission may become diminished.

SUMMARY OF THE INVENTION

Accordingly, the present invention has been made to solve the above-mentioned problems occurring in the prior art, and the present invention provides a method and system for resource allocation in a communication system.

Also, the present invention provides a method and system for resource allocation that can efficiently use downlink resources in a communication system. In accordance with an aspect of the present invention, there is provided a method for allocating resources in a communication system, the method includes calculating a size of a transmission area for transmitting the generated data when data to be transmitted to mobile stations is generated; and controlling data to be transmitted through the transmission area and then allocating the controlled data to the transmission area according to priorities of data bursts based on sizes of the data bursts.

In accordance with another aspect of the present invention, there is provided a system for allocating resources in a communication system, the system includes a base station for calculating a size of a transmission area for transmitting the generated data when data to be transmitted to mobile stations is generated, controlling data to be transmitted through the transmission area, and allocating the controlled data to the transmission area according to priorities of data bursts based on sizes of the data bursts.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, a detailed description of known functions and configurations incorporated herein will be omitted when it may make the subject matter of the present invention rather unclear.

The present invention provides a method and system for resource allocation in a communication system, e.g., an Institute of Electrical and Electronics Engineers (IEEE) 802.16 communication system, which is a Broadband Wireless Access (BWA) communication system. The following description of the present invention is based on an IEEE 802.16 communication system employing an Orthogonal Frequency Division Multiplexing (OFDM)/Orthogonal Frequency Division Multiple Access (OFDMA) scheme for convenience of description. However, the method and system for resource allocation of the present invention can be applied to other communication systems.

Further, the present invention provides a method and a system for data transmission between a transmitter controlling a cell, for example, a Base Station (BS), and a receiver using a communication service provided by the transmitter, for example, a Mobile Station (MS). Also, the present invention provides a method and system for efficiently allocating downlink data bursts for data transmission from the BS to the MS to predetermined downlink frames. Here, the BS transmits resource allocation information to the MSs through a MAP message. The MAP message transmitting downlink resource allocation information is a DownLink MAP (DL-MAP) message and a MAP message transmitting uplink resource allocation information is an UpLink MAP (UL-MAP) message. When the BS has transmitted the downlink resource allocation information and the uplink resource allocation information through the DL-MAP message and the UL-MAP message, each of the MSs can detect locations of the resources allocated to the MS itself and control information of data to be received by the MS itself, by decoding the DL-MAP message and the UL-MAP message. By detecting the allocated resource locations and the control information, the MSs can receive or transmit data through the downlink and uplink.

In the BWA communication system, data transmission/reception is performed frame by frame, and each frame is divided into an area for transmission of downlink data and an area for transmission of uplink data. Here, the areas for data transmission/reception are divided into elements in a two-dimensional arrangement of (frequency area×time area), and each element of the two-dimensional arrangement is called a slot, which is a unit for allocation. That is, the frequency area is divided into sub-channels, each of which is a group of sub-carriers, and the time area is divided into symbols. The slot refers to an area in which one sub-channel occupies a symbol, and each slot is allocated only one MS from among multiple MSs located within one sector. Further, a set of slots allocated to each of the MSs located within one sector is called a burst.

Figure 1:
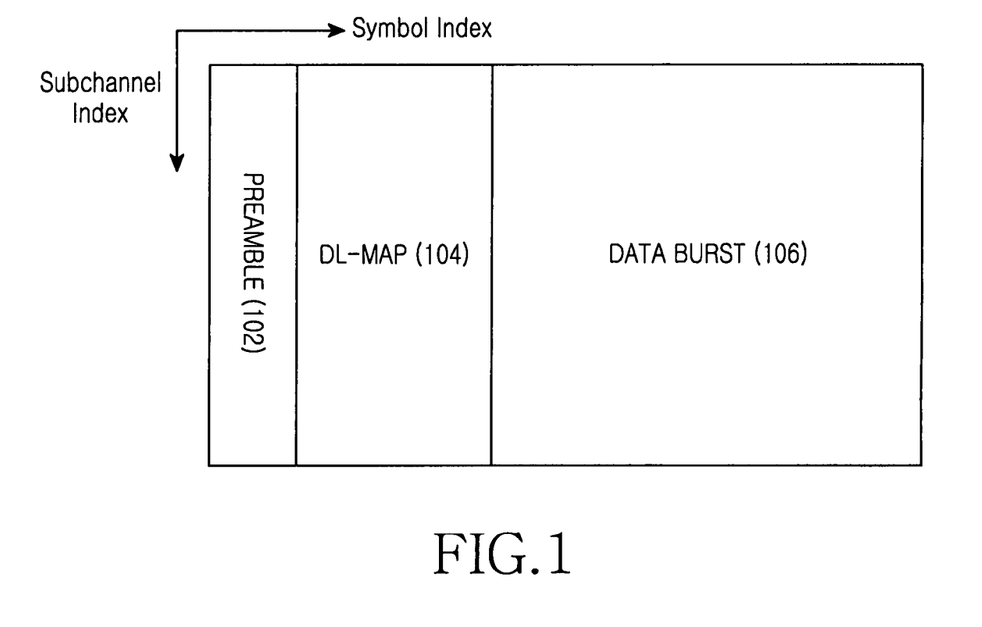
FIG. 1 is a schematic diagram illustrating a structure of a downlink frame in a communication system according to the present invention.

FIG. 1 is a schematic diagram illustrating a structure of a downlink frame in a communication system according to the present invention.

Referring to FIG. 1, the downlink frame is expressed by sub-channels and symbols in the time domain and the frequency domain, wherein y axis corresponds to the sub-channel, which is a resource unit of the frequency, and x axis corresponds to the OFDM symbol, which is a resource unit of the time. Further, the downlink frame is divided into a preamble area 102, a DL-MAP area 104, and a data burst area 106. A transmission/reception time interval, that is, a preamble sequence, which is a synchronization signal for acquisition of synchronization between the BS and the MS, is located in the preamble area 102. The DL-MAP area 104 includes a DL-MAP message containing broadcast data information commonly received by the MSs. Although not shown, the DL-MAP message includes a plurality of Information Elements (IEs), each of which contains information on the data burst area 106. Further, the data burst area 106 is allocated downlink data bursts transmitted to the MSs. The information on the locations and allocation of the downlink data bursts are included in the DL-MAP message of the DL-MAP area 104, as described above.

Figure 2:
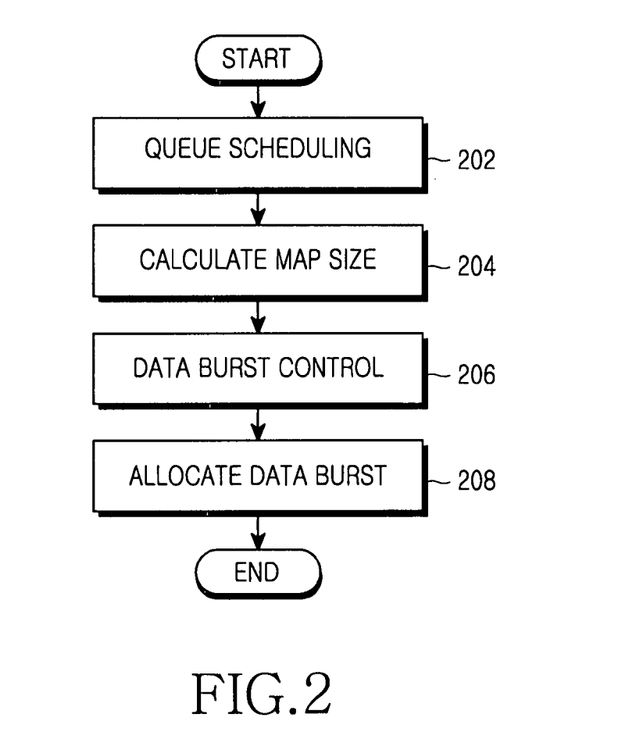
FIG. 2 is a flow diagram illustrating a process of allocating resources by a BS in a communication system according to the present invention.

FIG. 2 is a flow diagram illustrating a process of allocating resources by a BS in a communication system according to the present invention. As preconditions before describing FIG. 2, the data burst can be divided into an integer number of slots, and it is necessary to prevent waste of slots in a downlink frame when the BS performs two-dimensional allocation of data bursts according to the frequency and the time. Here, the downlink frame is divided according to the sub-channel (frequency axis) and the symbol axis (time axis), and includes a plurality of slots reflecting both the frequency and the time.

Referring to FIG. 2, first, in Step 202, the BS performs queue scheduling in order to determine a priority between connections for data bursts to be transmitted for each service class. Thereafter, the BS determines the type into which it will divide the data burst area 106, selects a frame structure corresponding to the determined type, and proceeds to Step 204. Here, the frame structure may have either a predetermined fixed format or a variable format according to the characteristics of the data bursts to be transmitted. Further, as shown in FIG. 1, the data burst area may have a frame structure in which the data burst area is divided into a plurality of sub-data burst areas.

In Step 204, the BS calculates and determines the MAP size by estimating a MAP overhead necessary for the data bursts to be transmitted, and then proceeds to Step 206. Here, the MAP size must be set to be large when there are many data bursts to be transmitted. However, if the MAP size is set to be large, the size of the data burst area is reduced by a same amount as an increase in the MAP size. Therefore, it is necessary to properly determine the MAP size and the data burst area size in consideration of a trade-off between them.

Next, in Step 206, the BS performs a data burst control for constructing data bursts having the same Modulation and Coding Scheme (MCS) level or data bursts transmitted to the same MS into one data burst unit, in order to minimize the MAP overhead. The MCS refers to a combination of modulation schemes and coding schemes, and can be defined to have a plurality of MCS levels from level 1 to level N according to the number of MCSs. Thereafter, in Step 208, the BS allocates the data bursts, which are input according to a transmission priority, to specific sub-data burst areas of the data burst area of the downlink frame in accordance with a predetermined rule. A process of allocating the data bursts to specific sub-data burst areas of the data burst area of the downlink frame in accordance with a predetermined rule will be described below in detail with reference to FIGS. 3 to 5.

Figure 3A:
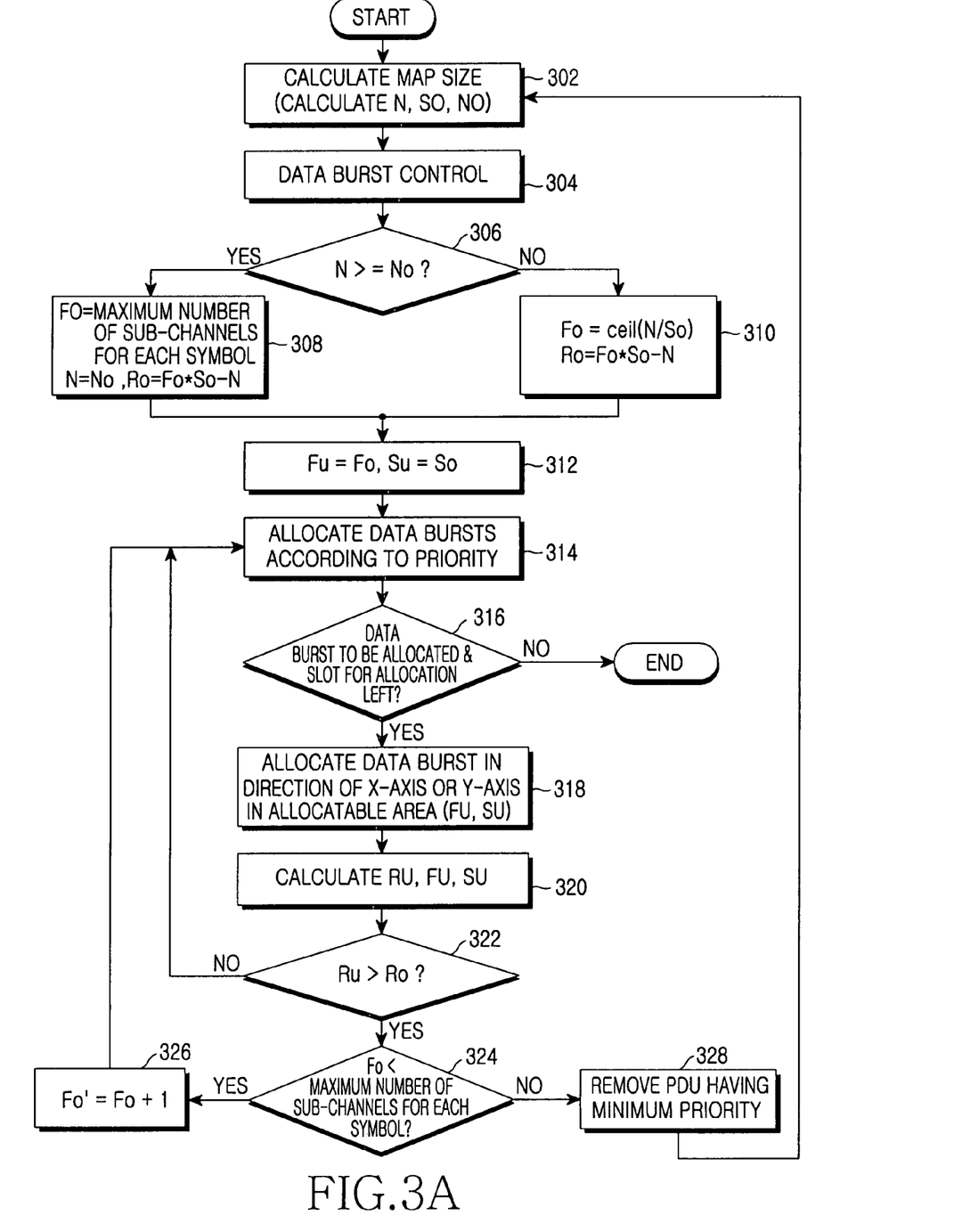
FIGS. 3A to 3C illustrate a process in which a BS allocates data bursts to a data burst area in a communication system according to the present invention.
Figure 3B:
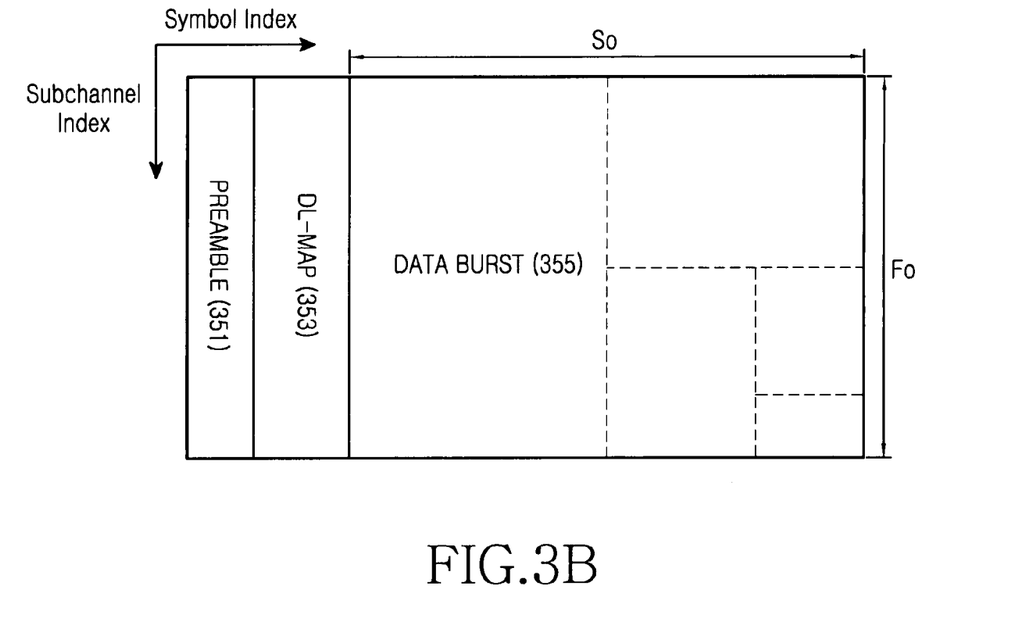
Figure 3C:
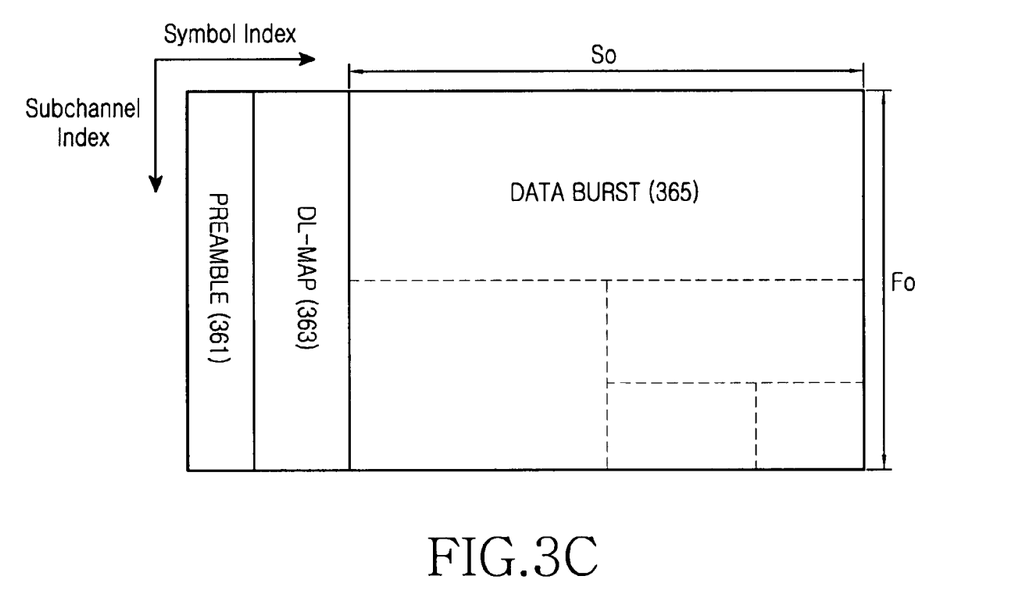

FIGS. 3A to 3C illustrate a process in which a BS allocates data bursts to a data burst area in a communication system according to the present invention. FIG. 3A is a flow diagram of the process in which a BS allocates data bursts to a data burst area, and FIGS. 3B and 3C illustrate examples of allocation of the data bursts to the data burst area according to the process shown in FIG. 3A.

Referring to FIG. 3A, in Step 302, the BS calculates and determines a MAP size by estimating a MAP overhead necessary for data bursts to be transmitted, as in Step 204 described above. Here, the MAP size must be set to have a large value when there are many data bursts to be transmitted. However, if the MAP size is set to have a large value, the size of the data burst area is reduced by a same amount as an increase in the MAP size. Therefore, it is necessary to properly determine the MAP size and the data burst area size in consideration of a trade-off between them. At this time, the BS calculates the total number (N) of slots which the BS itself must transmit to the MSs in order to calculate the MAP size, the number (So) of initial data symbols, the maximum number (No) of slots transmissible to the downlink sub-frames recognized from the calculated MAP size, and the number of downlink MAP IEs.

Next, in Step 304, the BS performs a data burst control for constructing data bursts having the same Modulation and Coding Scheme (MCS) level or data bursts transmitted to the same MS into one data burst unit, in order to minimize the MAP overhead, as in Step 206 described above. MCS refers to a combination of modulation schemes and coding schemes, and can be defined to have a plurality of MCS levels from level 1 to level N according to the number of MCSs. Thereafter, in Step 306, the BS compares the total number (N) of slots to be transmitted to the MSs calculated in Step 302 with the maximum number (No) of slots transmissible to the downlink sub-frames recognized from the calculated MAP size. As a result of the comparison in Step 306, when the total number (N) of slots to be transmitted to the MSs calculated in Step 302 is greater than or equal to the maximum number (No) of slots transmissible to the downlink sub-frames recognized from the calculated MAP size, the BS proceeds to Step 308. However, when the total number (N) of slots to be transmitted to the MSs calculated in Step 302 is less than the maximum number (No) of slots transmissible to the downlink sub-frames recognized from the calculated MAP size, the BS proceeds to Step 310.

In Step 308, the BS calculates the total number (N) of the slots to be transmitted to the MSs, the number (Fo) of minimum sub-channels necessary for transmission of the total N number of slots to the MSs, and an estimated maximum number (Ro) of allowable null-padded slots. Here, the total number (N) of the slots to be transmitted to the MSs corresponds to a maximum number of slots transmissible to the downlink sub-frame recognized from the calculated MAP size, and the number (Fo) of minimum sub-channels necessary for transmission of the total N number of slots to the MSs corresponds to the maximum number of sub-channels for each symbol. Further, the estimated maximum number (Ro) of allowable null-padded slots is defined by Equation (1) below.

$$Ro = Fo \times So - N \tag{1}$$

Meanwhile, in Step 310, the BS calculates the total number (N) of the slots to be transmitted to the MSs, the number (Fo) of minimum sub-channels necessary for transmission of the total N number of slots to the MSs, and an estimated maximum number (Ro) of allowable null-padded slots, as in Step 308. Here, the total number (N) of the slots to be transmitted to the MSs corresponds to the same total number (N) of the slots to be transmitted to the MSs as calculated in Step 302, the number (Fo) of minimum sub-channels necessary for transmission of the total N number of slots to the MSs is defined by Equation (2) below, and the estimated maximum number (Ro) of allowable null-padded slots is defined by Equation (1).

$$Fo = ceil(N/So) \tag{2}$$

Then, in Step 312, the BS calculates the number (Fu) of remaining sub-channels and the number (Su) of remaining symbols. Here, the number (Fu) of remaining sub-channels is equal to the number (Fo) of minimum sub-channels necessary for transmission of the total N number of slots to the MSs as calculated in Steps 308 and 310. Further, the number (Su) of remaining symbols is equal to the number (So) of the initial data symbols calculated in Step 302. Thereafter, in Step 314, the BS allocates data bursts to data burst areas of the downlink frame according a size-based sequence, more specifically, according to a sequence in which a data burst having a largest size is allocated before the other data bursts.

Then, in Step 316, the BS determines if there is any data burst to be allocated and if there is any slot to which a data burst can be allocated. As a result of the determination, when there are a data burst to be allocated and a slot to which a data burst can be allocated, the BS proceeds to Step 318. However, when there is no data burst to be allocated or when there is no slot to which a data burst can be allocated, the BS terminates the operation of allocating data bursts to the data burst area of the downlink frame.

Next, in Step 318, the BS allocates the data bursts in the y-axis direction, which fully uses the number (Su) of remaining symbols and corresponds to the direction of sub-channel axis increase in FIG. 1, or in the x-axis direction, which fully uses the number (Fu) of remaining sub-channels and corresponds to the direction of symbol axis increase in FIG. 1, so as to minimize the number of null-padded slots in the data burst-allocatable areas, that is, in the number (Su) of remaining symbols and the number (Fu) of remaining sub-channels calculated in Step 312. Hereinafter, Step 318 will be described in more detail with reference to FIGS. 3B and 3C.

As shown in FIG. 3B, in a data burst area 355 of a downlink frame including a preamble area 351, a DL-MAP area 353, and the data burst area 355, the BS allocates data bursts first fully along the y-axis and then along the x-axis. That is, in the data burst area 355, the BS allocates data bursts first fully in the direction of sub-channel axis for the number (Fu) of remaining sub-channels calculated in Step 312, that is, in the direction in which the minimum number (Fo) of sub-channels necessary for transmission of the total number (N) of the slots to the MSs becomes equal to the total number of sub-channels, and then in the direction in which the symbols increase.

As shown in FIG. 3C, in a data burst area 365 of a downlink frame including a preamble area 361, a DL-MAP area 363, and the data burst area 365, the BS allocates data bursts first fully along the x-axis and then along the y-axis. That is, in the data burst area 365, the BS allocates data bursts first fully in the direction of symbol axis for the number (Su) of remaining symbols calculated in Step 312, that is, in the direction in which the number (So) of the initial data symbols becomes equal to the total number of symbols, and then in the direction in which the sub-channels increase.

Thereafter, in Step 320, the BS calculates the number (Fu) of sub-remaining channels and the number (Su) of remaining symbols, which remain after allocation of data bursts along the x-axis or y-axis, and the number (Ru) of the accumulated null-padded slots. Then, in Step 322, the BS compares the number (Ru) of the accumulated null-padded slots calculated in Step 320 with the maximum number (Ro) of allowable null-padded slots calculated in Steps 308 and 310. As a result of the comparison in Step 322, the BS proceeds to Step 324 when the number (Ru) of the accumulated null-padded slots is greater than the maximum number (Ro) of allowable null-padded slots, and proceeds to Step 314 when the number (Ru) of the accumulated null-padded slots is less than or equal to the maximum number (Ro) of allowable null-padded slots.

In Step 324, the BS compares the number (Fo) of minimum sub-channels necessary for transmission of the total N number of slots to the MSs calculated in Steps 308 and 310 with the maximum number of sub-channels for each symbol. As a result of the comparison in Step 324, the BS proceeds to Step 326 when the number (Fo) of minimum sub-channels necessary for transmission of the total N number of slots to the MSs is less than the maximum number of sub-channels for each symbol, and proceeds to Step 328 when the number (Fo) of minimum sub-channels necessary for transmission of the total N number of slots to the MSs is greater than or equal to the maximum number of sub-channels for each symbol.

In Step 326, the BS adds one to the number (Fo) of minimum sub-channels necessary for transmission of the total N number of slots to the MSs, and then proceeds to Step 314 in which the BS allocates data bursts again to data burst areas of the downlink frame according a size-based sequence as described above. Meanwhile, in Step 328, the BS removes a Packet Data Unit (PDU) having a minimum Quality of Service (QoS) priority, and then proceeds to Step 302. At this time, in calculating the total number (N) of the slots which the BS itself must transmit to the MSs in Step 302, the BS does not include a PDU having a QoS priority next to the minimum QoS priority removed in Step 328.

Figure 4:
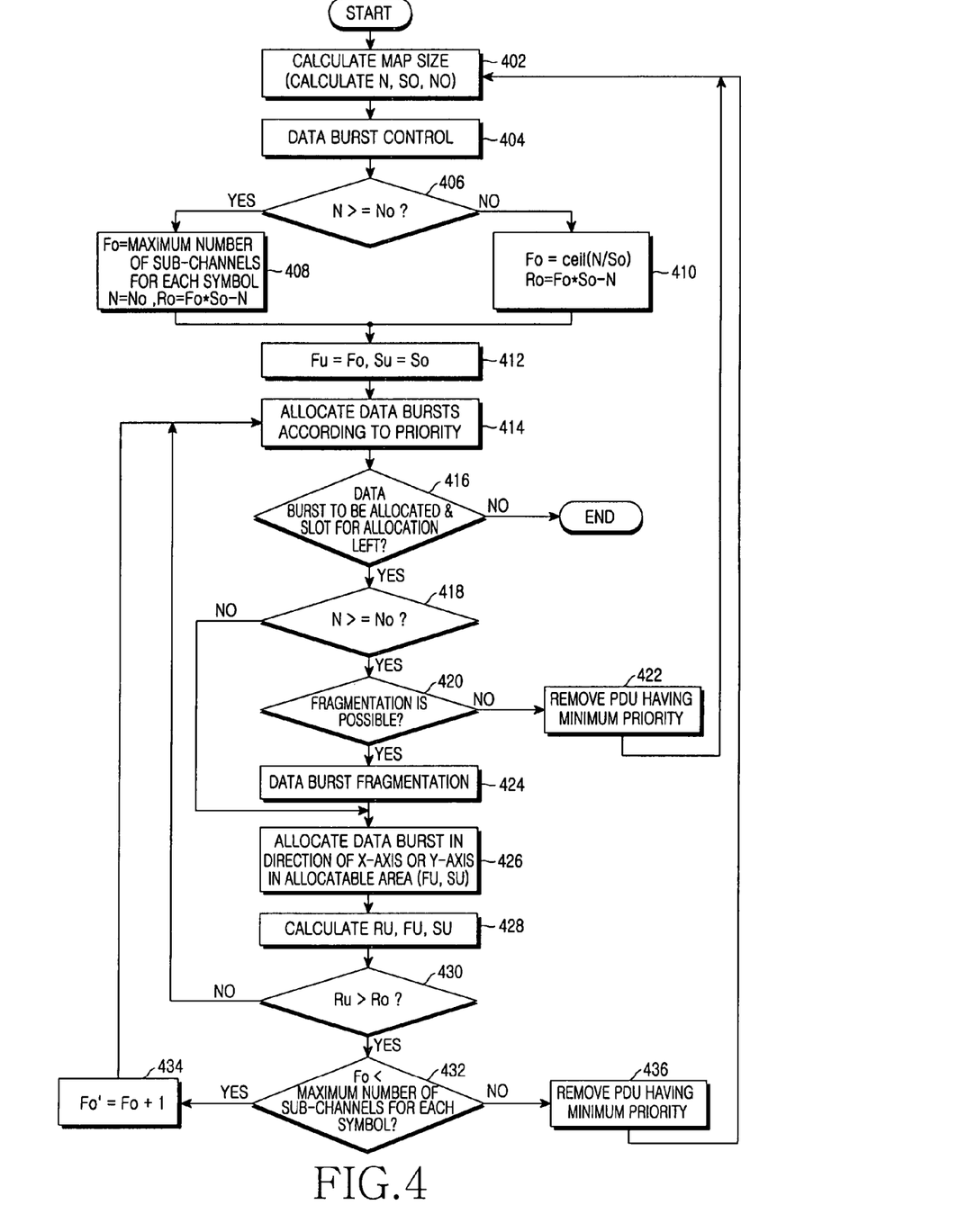
FIG. 4 is a flow diagram illustrating a process of data burst allocation including data burst fragmentation in a data burst area by a BS in a communication system according the present invention.

FIG. 4 is a flow diagram illustrating a process of data burst allocation including data burst fragmentation in a data burst area by a BS in a communication system according to the present invention. As shown in FIG. 4, the BS determines if it is possible to fragment the data burst to be allocated after Step 206 of FIG. 2. When the determination concludes that the fragmentation is possible, the BS fragments the data burst to be allocated and allocates the fragmented data burst.

Referring to FIG. 4, in Step 402, the BS calculates and determines a MAP size by estimating a MAP overhead necessary for data bursts to be transmitted, as in Step 302 of FIG. 3 described above. Here, the MAP size must be set to have a large value when there are many data bursts to be transmitted. However, if the MAP size is set to have a large value, the size of the data burst area is reduced by a same amount as an increase in the MAP size. Therefore, it is necessary to properly determine the MAP size and the data burst area size in consideration of a trade-off between them. At this time, the BS calculates the total number (N) of slots which the BS itself must transmit to the MSs in order to calculate the MAP size, the number (So) of initial data symbols, the maximum number (No) of slots transmissible to the downlink sub-frames recognized from the calculated MAP size, and the number of downlink MAP IEs.

Next, in Step 404, the BS performs a data burst control for constructing data bursts having a same Modulation and Coding Scheme (MCS) level or data bursts transmitted to the same MS into one data burst unit, in order to minimize the MAP overhead, as in Step 304 described above. The MCS refers to a combination of modulation schemes and coding schemes, and can be defined to have a plurality of MCS levels from level 1 to level N according to the number of MCSs. Thereafter, in Step 406, the BS compares the total number (N) of slots to be transmitted to the MSs calculated in Step 402 with the maximum number (No) of slots transmissible to the downlink sub-frames recognized from the calculated MAP size. As a result of the comparison in Step 406, when the total number (N) of slots to be transmitted to the MSs calculated in Step 402 is greater than or equal to the maximum number (No) of slots transmissible to the downlink sub-frames recognized from the calculated MAP size, the BS proceeds to Step 408. However, when the total number (N) of slots to be transmitted to the MSs calculated in Step 402 is less than the maximum number (No) of slots transmissible to the downlink sub-frames recognized from the calculated MAP size, the BS proceeds to Step 410.

In Step 408, the BS calculates the total number (N) of the slots to be transmitted to the MSs, the number (Fo) of minimum sub-channels necessary for transmission of the total N number of slots to the MSs, and an estimated maximum number (Ro) of allowable null-padded slots. Here, the total number (N) of the slots to be transmitted to the MSs corresponds to a maximum number of slots transmissible to the downlink sub-frame recognized from the calculated MAP size, and the number (Fo) of minimum sub-channels necessary for transmission of the total N number of slots to the MSs corresponds to the maximum number of sub-channels for each symbol. Further, the estimated maximum number (Ro) of allowable null-padded slots is defined by Equation (1) as described above.

Meanwhile, in Step 410, the BS calculates the total number (N) of the slots to be transmitted to the MSs, the number (Fo) of minimum sub-channels necessary for transmission of the total N number of slots to the MSs, and an estimated maximum number (Ro) of allowable null-padded slots, as in Step 408. Here, the total number (N) of the slots to be transmitted to the MSs corresponds to the same total number (N) of the slots to be transmitted to the MSs as calculated in Step 402, the number (Fo) of minimum sub-channels necessary for transmission of the total N number of slots to the MSs is defined by Equation (2), and the estimated maximum number (Ro) of allowable null-padded slots is defined by Equation (1).

Then, in Step 412, the BS calculates the number (Fu) of remaining sub-channels and the number (Su) of remaining symbols. Here, the number (Fu) of remaining sub-channels is equal to the number (Fo) of minimum sub-channels necessary for transmission of the total N number of slots to the MSs as calculated in Steps 408 and 410. Further, the number (Su) of remaining symbols is equal to the number (So) of the initial data symbols calculated in Step 402. Thereafter, in Step 414, the BS allocates data bursts to data burst areas of the downlink frame according a size-based sequence, more specifically, according to a sequence in which a data burst having a largest size is allocated before the other data bursts.

Then, in Step 416, the BS determines if there is any data burst to be allocated and if there is any slot to which a data burst can be allocated. As a result of the determination, when there are a data burst to be allocated and a slot to which a data burst can be allocated, the BS proceeds to Step 418. However, when there is no data burst to be allocated or when there is no slot to which a data burst can be allocated, the BS terminates the operation of allocating data bursts to the data burst area of the downlink frame. Next, in Step 418, the BS compares the total number (N) of the slots to be transmitted to the MSs remaining after the data burst allocation in Step 414 with the maximum number (No) of slots transmissible to the downlink sub-frames recognized from the calculated MAP size. As a result of the comparison in Step 418, when the total number (N) of the slots to be transmitted to the MSs is greater than or equal to the maximum number (No) of slots transmissible to the downlink sub-frames recognized from the calculated MAP size, the BS proceeds to Step 420. However, when the total number (N) of the slots to be transmitted to the MSs is less than the maximum number (No) of slots transmissible to the downlink sub-frames recognized from the calculated MAP size, the BS proceeds to Step 426. When the total number (N) of the slots to be transmitted to the MSs is less than the maximum number (No) of slots transmissible to the downlink sub-frames recognized from the calculated MAP size, the BS does not perform the fragmentation of the data burst.

In Step 420, the BS determines if data burst fragmentation is possible in the data burst area of the downlink frame. As a result of the determination in Step 420, the BS proceeds to Step 424 when data burst fragmentation is possible or to Step 422 when data burst fragmentation is impossible. In Step 422, the BS removes a PDU having a minimum QoS priority, and then proceeds to Step 402. At this time, in calculating the total number (N) of the slots which the BS itself must transmit to the MSs in Step 402, the BS does not include a PDU having a QoS priority next to the minimum QoS priority removed in Step 422.

Further, in Step 424, the BS fragments a data burst having the minimum QoS priority estimated in Steps 402 and 404, and then proceeds to Step 426. In performing the fragmentation, the BS maintains the allocation to be available to slots except for the slots to which data bursts having a higher QoS priority than that of the data burst to be fragmented will be allocated. Thereafter, in Step 426, the BS allocates the data bursts in the y-axis direction, which fully uses the number (Su) of remaining symbols and corresponds to the direction of sub-channel axis increase in FIG. 1, or in the x-axis direction, which fully uses the number (Fu) of remaining sub-channels and corresponds to the direction of symbol axis increase in FIG. 1, so as to minimize the number of null-padded slots in the data burst-allocatable areas, that is, in the number (Su) of remaining symbols and the number (Fu) of remaining sub-channels calculated in Step 412. Hereinafter, the operation in Step 426 is the same as that of Step 318 described above with reference to FIGS. 3B and 3C, so a detailed description thereof is omitted here.

Thereafter, in Step 428, the BS calculates the number (Fu) of sub-remaining channels and the number (Su) of remaining symbols, which remain after allocation of data bursts along the x-axis or y-axis, and the number (Ru) of the accumulated null-padded slots. Then, in Step 430, the BS compares the number (Ru) of the accumulated null-padded slots calculated in Step 428 with the maximum number (Ro) of allowable null-padded slots calculated in Steps 408 and 410. As a result of the comparison in Step 430, the BS proceeds to Step 432 when the number (Ru) of the accumulated null-padded slots is greater than the maximum number (Ro) of allowable null-padded slots, and proceeds to Step 414 when the number (Ru) of the accumulated null-padded slots is less than or equal to the maximum number (Ro) of allowable null-padded slots.

In Step 432, the BS compares the number (Fo) of minimum sub-channels necessary for transmission of the total N number of slots to the MSs calculated in Steps 408 and 410 with the maximum number of sub-channels for each symbol. As a result of the comparison in Step 432, the BS proceeds to Step 434 when the number (Fo) of minimum sub-channels necessary for transmission of the total N number of slots to the MSs is less than the maximum number of sub-channels for each symbol, and proceeds to Step 436 when the number (Fo) of minimum sub-channels necessary for transmission of the total N number of slots to the MSs is greater than or equal to the maximum number of sub-channels for each symbol.

In Step 434, the BS adds one to the number (Fo) of minimum sub-channels necessary for transmission of the total N number of slots to the MSs, and then proceeds to Step 414 in which the BS allocates data bursts again to data burst areas of the downlink frame according a size-based sequence as described above. Meanwhile, in Step 436, the BS removes a Packet Data Unit (PDU) having a minimum Quality of Service (QoS) priority, and then proceeds to Step 402. At this time, in calculating the total number (N) of the slots which the BS itself must transmit to the MSs in Step 402, the BS does not include a PDU having a QoS priority next to the minimum QoS priority removed in Step 436.

Figure 5A:
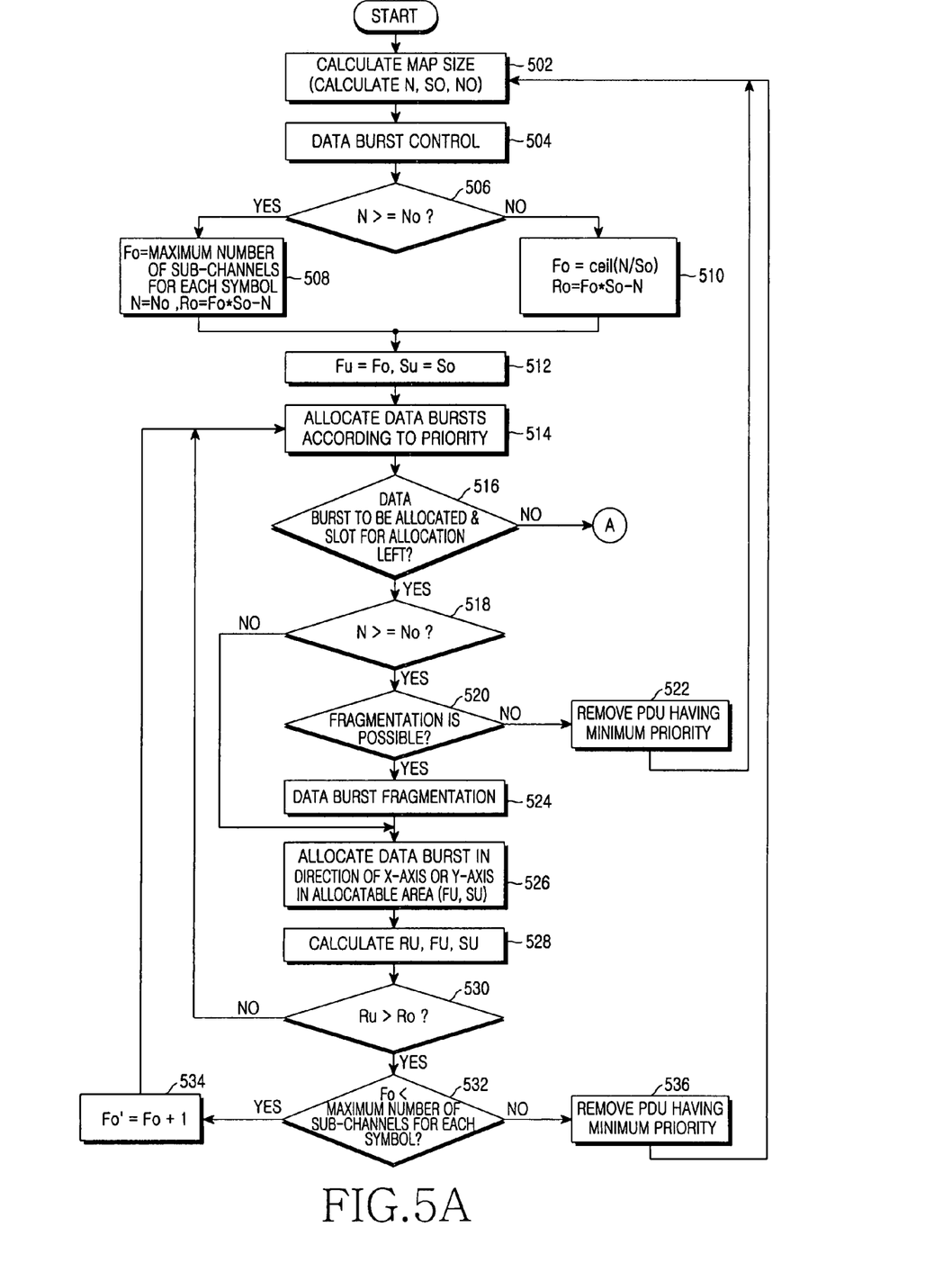
FIGS. 5A and 5B illustrate a flow diagram of a procedure of data burst allocation in a communication system according to the present invention, which includes data burst fragmentation in a data burst area and an algorithm for slot allocation by a BS when there is a slot for allocation.
Figure 5B:
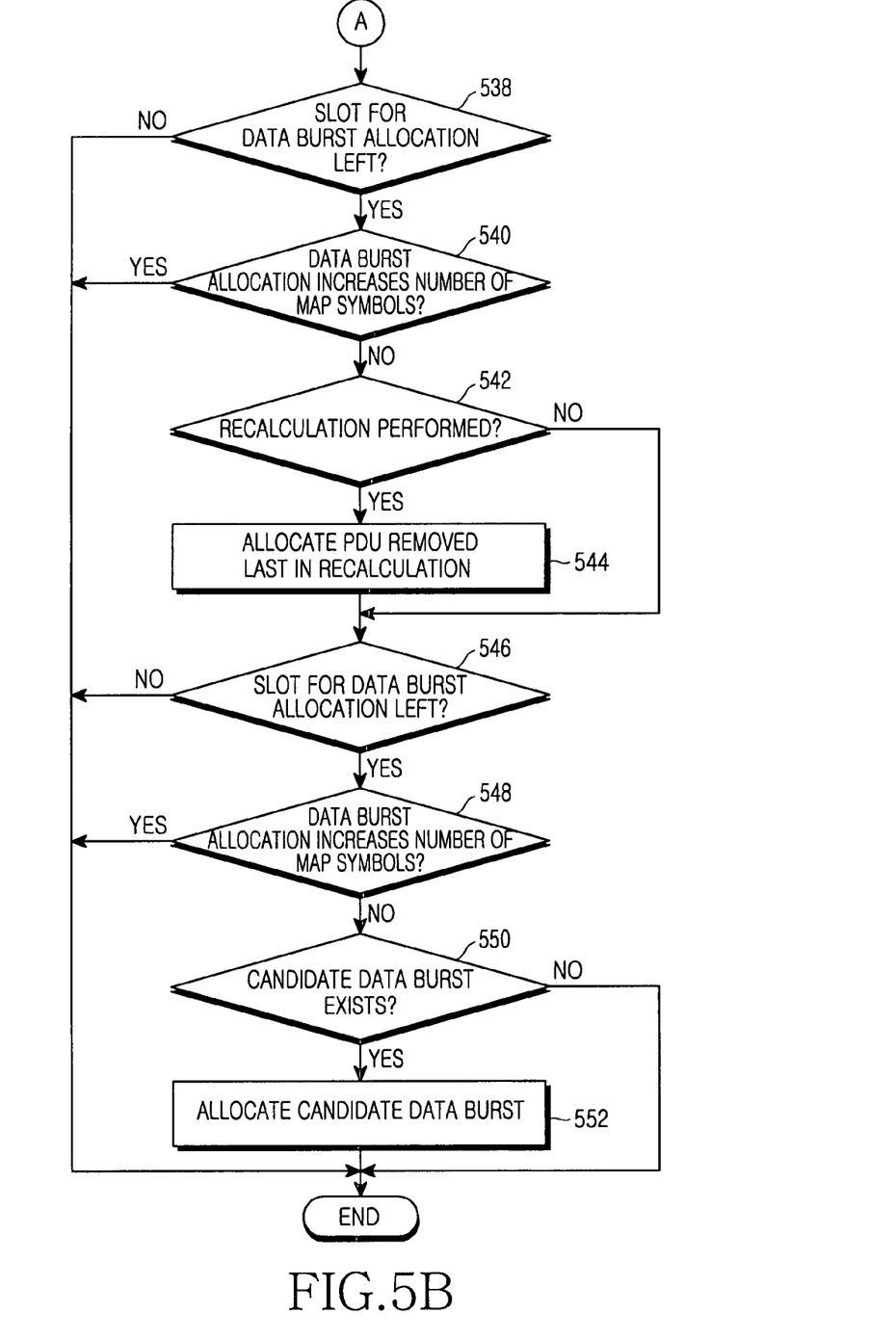

FIGS. 5A and 5B illustrate a flow diagram of a procedure of data burst allocation in a communication system according to the present invention, which includes data burst fragmentation in a data burst area and an algorithm for slot allocation by a BS when there is a slot for allocation. Specifically, FIG. 5A illustrates an operation for data burst allocation by a BS, which includes the same data burst fragmentation as that described above with reference to FIG. 4, and FIG. 5B illustrates an operation of slot allocation by a BS when there is a slot for allocation. With the exception of a determination in Step 516 that there is no data burst to be allocated or no slot to which a data burst can be allocated and the BS thus proceeding to Step 538 in FIG. 5B, the operation of the BS shown in FIG. 5A is the same as that in FIG. 4, which has been described above in detail, so a detailed description thereof is omitted here. Hereinafter, the operation of data burst allocation by the BS will be described with reference to only FIG. 5B.

Referring to FIG. 5B, as a result of determination in Step 516, when there is no data burst to be allocated or no slot to which a data burst can be allocated, the BS proceeds to Step 538. In Step 538, the BS allocates the data bursts determined as allocatable in Step 502 according to a sequence based on the size of the data bursts and determines if there is any slot to which the data burst will be allocated. As a result of the determination in Step 538, the BS proceeds to Step 540 when there is a slot to which the data burst will be allocated. However, when there is no slot to which the data burst will be allocated, the BS terminates the operation of data burst allocation to the data burst area of the downlink data frame.

In Step 540, the BS determines if the number of MAP symbols increases due to the downlink MAP information that must be added in order to additionally allocate data bursts. As a result of the determination in Step 540, the BS proceeds to Step 542 when the additional data burst allocation does not increase the number of MAP symbols, and terminates the operation of data burst allocation to the data burst area of the downlink data frame when the number of MAP symbols increases due to the additional data burst allocation. Then, in Step 542, the BS determines if Step 536 of FIG. 5A has been executed. That is, the BS determines if the total number (N) of the slots to be transmitted to the MSs has been recalculated in a state in which a PDU having a minimum QoS priority has been removed and a PDU having a QoS priority next to the minimum QoS priority of the removed PDU is not included. As a result of the determination in Step 542, the BS proceeds to Step 544 when Step 536 has been performed, and proceeds to Step 546 when Step 536 has not been performed.

In Step 544, the BS allocates the PDU finally removed in Step 536 to existing slots. At this time, if the existing slots have a size smaller than the finally removed PDU, the BS determines if it is possible to fragment the PDU. Based on a result of the determination, the BS either allocates the finally removed PDU after fragmenting it or discards it. Thereafter, in Step 546, the BS determines if there is any slot to which the data burst can be allocated, as described above for Step 538. As a result of the determination in Step 546, the BS proceeds to Step 548 when there is a slot to which the data burst can be allocated, and terminates the operation of data burst allocation to the data burst area of the downlink data frame when there is no slot to which the data burst can be allocated.

In Step 548, the BS determines if the number of MAP symbols increases due to the downlink MAP information that must be added in order to additionally allocate data bursts, as in Step 540. As a result of the determination in Step 548, the BS proceeds to Step 550 when the additional data burst allocation does not increase the number of MAP symbols, and terminates the operation of data burst allocation to the data burst area of the downlink data frame when the number of MAP symbols increases due to the additional data burst allocation. Then, in Step 550, the BS determines if there is any candidate data burst. As a result of the determination in Step 550, the BS proceeds to Step 552 when there is a candidate data burst, and terminates the operation of data burst allocation to the data burst area of the downlink data frame when there is no candidate data burst. Here, the candidate data burst refers to a set of PDUs having the same MCS level to be allocated to the existing slots from a PDU having the highest QoS priority from among the PDUs having the highest MCS level remaining in the queue and waiting for transmission as well as the PDU determined to be allocatable in Step 502. In Step 552, the BS allocates the candidate data burst to the existing slots, and then terminates the operation of data burst allocation to the data burst area of the downlink data frame. At this time, if the existing slots have a size smaller than the candidate data burst, the BS determines if it is possible to fragment the candidate data burst. Based on a result of the determination, the BS either allocates the candidate data burst after fragmenting it or discards it.

According to the present invention as described above, it is possible to efficiently allocate data bursts while minimizing waste of slots in consideration of the number of null-padded slots and the size of the data burst in a data burst allocation area of a downlink frame in a communication system. Therefore, the present invention can achieve efficient use of resources of the entire system. Further, according to the present invention, PDUs having the same MCS level or data bursts transmitted the same MS can be constructed into one data burst. Therefore, the present invention can minimize the MAP overhead and improve the system performance.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for allocating resources in a communication system, the method comprising:
   if data bursts to be transmitted to mobile stations are generated, calculating a size of a transmission area for transmitting the generated data bursts;
   determining data bursts to be transmitted through the transmission area and then allocating the determined data bursts to the transmission area according to priorities of the determined data bursts based on sizes of the determined data bursts; and
   allocating an existing data burst to an existing transmission area while minimizing a number of null-padded slots in the existing transmission area, when there exists an existing data burst to be allocated and a transmission area after allocating the determined data bursts to the transmission area according to the priorities of the determined data bursts based on the sizes of the determined data bursts,
   wherein determining data bursts to be transmitted through the transmission area includes constructing data bursts to be transmitted to same mobile stations and data bursts having a same Modulation and Coding Scheme (MCS) level into one data unit.

2. The method as claimed in claim 1, wherein allocating the determined data bursts to the transmission area according to the priorities of the determined data bursts based on sizes of the data bursts comprises calculating a number of symbols of the determined data bursts and a minimum number of subchannels necessary for transmission of the determined data bursts to the mobile stations.

3. The method as claimed in claim 2, wherein calculating the number of symbols and the minimum number of subchannels comprises calculating a maximum number of allowed null-padded slots.

4. The method as claimed in claim 1, wherein calculating the size of the transmission area comprises calculating a total number of slots to be allocated to the mobile stations for data burst transmission, a number of symbols of the determined data bursts, a maximum number of slots transmissible in the transmission area, and a number of Information Elements (IEs) of the transmission area.

5. The method as claimed in claim 1, wherein allocating the existing data burst to the existing transmission area while minimizing the number of null-padded slots in the existing transmission area comprises allocating the existing data burst to the existing transmission area according to a number of remaining symbols and a number of remaining sub-channels in the existing transmission area.

6. The method as claimed in claim 1, wherein allocating the existing data burst to the existing transmission area while minimizing the number of null-padded slots in the existing transmission area comprises dividing the existing data burst and allocating the divided data burst to the existing transmission area.

7. The method as claimed in claim 6, wherein allocating the existing data burst to the existing transmission area while minimizing the number of null-padded slots in the existing transmission area comprises removing a data burst having a minimum Quality of Service (QoS) priority when it is impossible to divide the existing data burst.

8. The method as claimed in claim 1, wherein allocating the existing data burst to the existing transmission area while minimizing the number of null-padded slots in the existing transmission area comprises calculating the number of remaining symbols and a number of remaining sub-channels in the transmission area and the number of accumulated null-padded slots.

9. The method as claimed in claim 8, further comprising comparing the calculated number of accumulated null-padded slots with a maximum number of allowed null-padded slots, and allocating the determined data bursts to the transmission area according to the priorities of the determined data bursts based on the sizes of the determined data bursts according to a result of the comparison.

10. The method as claimed in claim 9, wherein allocating the determined data bursts to the transmission area according to the priorities of the determined data bursts based on the sizes of the determined data bursts according to the result of the comparison comprises:
    comparing a minimum number of sub-channels necessary for transmission of the determined data bursts to the mobile stations with the maximum number of sub-channels for each symbol;
    increasing the minimum number of sub-channels by a predetermined number according to a result of the comparison; and
    allocating the determined data bursts to the transmission area according to the priorities of the determined data bursts based on the sizes of the data bursts.

11. The method as claimed in claim 9, wherein allocating the determined data bursts to the transmission area according to priorities of the data bursts based on the sizes of the determined data bursts according to the result of the comparison comprises:
    comparing a minimum number of sub-channels necessary for transmission of the determined data bursts to the mobile stations with the maximum number of sub-channels for each symbol; and
    removing a data burst having a minimum Quality of Service (QoS) priority according to a result of the comparison.

12. The method as claimed in claim 1, further comprising, determining whether to remove a data burst having a minimum Quality of Service (QoS) priority, when there exists an existing transmission area to which a data burst can be allocated after allocating the determined data bursts to the transmission area according to the priorities of the determined data bursts based on the sizes of the determined data bursts and allocating a data burst having the minimum QoS priority, which has been removed last according to a result of the determination, to the existing transmission area.

13. The method as claimed in claim 1, further comprising determining whether there exists a candidate data burst, when there exists an existing transmission area to which data can be allocated after allocating the determined data bursts to the transmission area according to the priorities of the determined data bursts based on the sizes of the determined data bursts and allocating the candidate data burst to the existing transmission area according to a result of the determination.

14. The method as claimed in claim 13, wherein the candidate data burst includes a data burst which has a highest Quality of Service (QoS) priority from among data bursts waiting for transmission to the mobile stations.

15. A system for allocating resources in a communication system, the system comprising a base station for, if data bursts to be transmitted to mobile stations are generated, calculating a size of a transmission area for transmitting the generated data bursts, determining data bursts to be transmitted through the transmission area, and allocating the determined data bursts to the transmission area according to the priorities of the data bursts based on the sizes of the determined data bursts,
    wherein the base station constructs data bursts to be transmitted to same mobile stations and data bursts having a same Modulation and Coding Scheme (MCS) level into one data unit, and
    wherein the base station allocates an existing data burst to an existing transmission area while minimizing a number of null-padded slots in the existing transmission area, when there exists the existing data burst to be allocated and a transmission area after allocating the determined data bursts to the transmission area according to the priorities of the determined data bursts based on the sizes of the determined data bursts.

16. The system as claimed in claim 15, wherein the base station calculates a number of symbols of the determined data bursts and a minimum number of sub-channels necessary for transmission of the determined data bursts to the mobile stations.

17. The system as claimed in claim 16, wherein the base station calculates a maximum number of allowed null-padded slots.

18. The system as claimed in claim 15, wherein the base station calculates the total number of slots to be allocated to the mobile stations for data burst transmission, a number of symbols of the determined data bursts, a maximum number of slots transmissible in the transmission area, and a number of Information Elements (IEs) of the transmission area.

19. The system as claimed in claim 15, wherein the base station allocates the existing data burst to the existing transmission area based on a number of remaining symbols and a number of remaining sub-channels in the existing transmission area.

20. The system as claimed in claim 15, wherein the base station divides the existing data burst and allocates the divided data burst to the existing transmission area.

21. The system as claimed in claim 20, wherein the base station removes a data burst having a minimum Quality of Service (QoS) priority when it is impossible to divide the existing data burst.

22. The system as claimed in claim 15, wherein the base station calculates a number of remaining symbols and a number of remaining sub-channels in the transmission area and a number of accumulated null-padded slots.

23. The system as claimed in claim 22, wherein the base station compares the calculated number of accumulated null-padded slots with the maximum number of allowed null-padded slots, and allocates the determined data bursts to the transmission area according to the priorities of the determined data bursts based on the sizes of the determined data bursts according to a result of the comparison.

24. The system as claimed in claim 23, wherein the base station compares a minimum number of sub-channels necessary for transmission of the determined data bursts to the mobile stations with a maximum number of sub-channels for each symbol, increases the minimum number of sub-channels by a predetermined number according to a result of the comparison, and allocates the determined data bursts to the transmission area according to the priorities of the determined data bursts based on the sizes of the determined data bursts.

25. The system as claimed in claim 23, wherein the base station compares a minimum number of sub-channels necessary for transmission of the determined data bursts to the mobile stations with a maximum number of sub-channels for each symbol, and removes a data burst having a minimum Quality of Service (QoS) priority according to a result of the comparison.

26. The system as claimed in claim 15, wherein the base station determines whether to remove a data burst having a minimum Quality of Service (QoS) priority, when there exists an existing transmission area to which a data burst can be allocated after allocating the determined data bursts to the transmission area according to the priorities of the determined data bursts based on the sizes of the determined data bursts and allocates a data burst having the minimum QoS priority, which has been removed last according to a result of the determination, to the existing transmission area.

27. The system as claimed in claim 15, wherein the base station determines whether there exists a candidate data burst, when there exists an existing transmission area to which data can be allocated after allocating the determined data bursts to the transmission area according to the priorities of the determined data bursts based on the sizes of the determined data bursts and allocates the candidate data burst to the existing transmission area according to a result of the determination.

28. The system as claimed in claim 27, wherein the candidate data burst includes a data burst which has a highest Quality of Service (QoS) priority from among data bursts waiting for transmission to the mobile stations.

* * * * *